(12) United States Patent
Kikuchi

(10) Patent No.: US 6,628,973 B1
(45) Date of Patent: Sep. 30, 2003

(54) RADIO DATA COMMUNICATION APPARATUS AND METHOD OF RADIO DATA COMMUNICATION

(75) Inventor: Tsuneyuki Kikuchi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/490,358

(22) Filed: Jan. 24, 2000

(30) Foreign Application Priority Data

Jan. 28, 1999 (JP) .......................................... 11-020783

(51) Int. Cl.[7] ................................................ H04B 1/38
(52) U.S. Cl. ...................................... 455/575; 455/418
(58) Field of Search .................... 379/356.01; 455/32.1, 455/67.7, 411, 112, 414, 419, 418, 410, 433, 422, 434, 435, 448, 438, 452, 575; 378/911, 912

(56) References Cited

U.S. PATENT DOCUMENTS

| | | | |
|---|---|---|---|
| 5,450,613 A | * 9/1995 | Takahara et al. ............ | 455/54.1 |
| 5,850,343 A | * 12/1998 | Nakamura .............. | 364/474.16 |
| 5,887,253 A | * 3/1999 | O'Neil et al. ................ | 455/418 |
| 6,201,964 B1 | * 3/2001 | Tung et al. .................. | 455/432 |
| 6,226,531 B1 | * 5/2001 | Holt et al. ................... | 455/562 |
| 6,295,355 B1 | * 9/2001 | O'Neal et al. ............... | 379/356 |
| 6,411,632 B2 | * 6/2002 | Linggren et al. ........... | 370/466 |

FOREIGN PATENT DOCUMENTS

| | | |
|---|---|---|
| JP | 4-321192 | 11/1992 |
| JP | 9-149455 | 6/1997 |
| JP | 9-181854 | 7/1997 |
| JP | 9-247216 | 9/1997 |
| JP | 9284852 | 10/1997 |
| JP | 10-174169 | 6/1998 |
| JP | 10-191409 | 7/1998 |

* cited by examiner

Primary Examiner—William Trost
Assistant Examiner—N Mehrpour
(74) Attorney, Agent, or Firm—Dickstein, Shapiro, Morin & Oshinsky, LLP.

(57) ABSTRACT

A radio communication apparatus is provided which is capable of automatically selecting a suitable radio communication device at the time of activating a communication application such as an electronic mail or a file transfer. This radio communication apparatus comprises a first table for predefining an important judgement parameter out of a plurality of judgement parameters corresponding to a plurality of communication applications, a second table for pre-setting data corresponding to a plurality of judgement parameters corresponding to a plurality of radio communication devices, and control devices for selecting a radio communication device by referring to the second table based on an important judgement parameter acquired by the second table based on an important judgement parameter acquired by referring to the first table in response to activation of a communication application.

23 Claims, 11 Drawing Sheets

Fig. 4

| APPLICATION TYPE (PORT NUMBER) | TIME | TOLL | POWER CONSUMPTION |
|---|---|---|---|
| FTP (21) | ○ | | |
| E-mail (25) | | ○ | |
| www (80) | | | ○ |

Fig. 5

| RADIO COMMUNICATION DEVICE | SENDING AND SENDING TIME (sec./1KB) | TOLL (yen/10sec.) | POWER CONSUMPTION (mAH) |
|---|---|---|---|
| RADIO COMMUNICATION DEVICE: 103 | 0.33 | 25 | 600 |
| RADIO COMMUNICATION DEVICE: 105 | 0.62 | 12 | 500 |
| RADIO COMMUNICATION DEVICE: 107 | 0.41 | 18 | 400 |

Fig. 7

| APPLICATION TYPE (PORT NUMBER) | TIME | TOLL | POWER CONSUMPTION |
|---|---|---|---|
| FTP (21) | 1 | 2 | 3 |
| E-mail (25) | 3 | 1 | 2 |
| WWW (80) | 2 | 3 | 1 |

Fig. 9

| APPLICATION TYPE (PORT NUMBER) | TIME | TOLL | POWER CONSUMPTION |
|---|---|---|---|
| FTP (21) | 4.8 | 4.2 | 1 |
| E-mail (25) | 1.5 | 6.0 | 2.5 |
| WWW (80) | 1.8 | 1.2 | 7.0 |

Fig. 11

| RADIO COMMUNICATION DEVICE | THE LINE STATE/DATA EXCHANGE TIME (sec./1KB) | | | | TOLL (yen/10sec.) | POWER CONSUMPTION (mAH) |
|---|---|---|---|---|---|---|
| | LEVEL 4 | LEVEL 3 | LEVEL 2 | LEVEL 1 | | |
| RADIO COMMUNICATION DEVICE: 103 | 0.33 | 0.50 | 1.00 | 1.58 | 25 | 600 |
| RADIO COMMUNICATION DEVICE: 105 | 0.62 | 1.21 | 2.33 | 3.95 | 12 | 500 |
| RADIO COMMUNICATION DEVICE: 107 | 0.41 | 0.51 | 0.61 | 0.91 | 18 | 400 |

Fig. 12

| RADIO COMMUNICATION DEVICE | SENDING AND SENDING TIME (sec./1KB) | CONNECTION PROCESSING TIME (sec.) | TOLL (yen/10sec.) | POWER CONSUMPTION (mAH) |
|---|---|---|---|---|
| RADIO COMMUNICATION DEVICE: 103 | 0.33 | 45 | 25 | 600 |
| RADIO COMMUNICATION DEVICE: 105 | 0.62 | 15 | 12 | 500 |
| RADIO COMMUNICATION DEVICE: 107 | 0.41 | 20 | 18 | 400 |

Fig. 14

| RADIO COMMUNICATION DEVICE | SENDING AND SENDING TIME (sec./1KB) | TOLL (yen/10sec.) | POWER CONSUMPTION (mAH) |
|---|---|---|---|
| RADIO COMMUNICATION DEVICE: 103 | 0.33 | 50 | 600 |
| RADIO COMMUNICATION DEVICE: 105 | 0.62 | 28 | 500 |
| RADIO COMMUNICATION DEVICE: 107 | 0.41 | 40 | 400 |

Fig. 13

| RADIO COMMUNICATION DEVICE | SENDING AND SENDING TIME (sec./1KB) | TOLL(yen) | | | | POWER CONSUMPTION (mAH) |
|---|---|---|---|---|---|---|
| | | AMOUNT OF TIME (~1HOUR/~) | TIME ZONE (DAYTIME /NIGHT TIME) | DAY OF WEEK (BUSINESS DAYS /NON BUSINESS DAYS) | DISTANCE FROM THE PARTNER (~100km/~) | |
| RADIO COMMUNICATION DEVICE: 103 | 0.33 | 450/400 | 450/x0.5 | 450/x0.5 | 450/x2.0 | 600 |
| RADIO COMMUNICATION DEVICE: 105 | 0.62 | 180/150 | 180/x0.6 | 180/x0.6 | 180/x1.5 | 500 |
| RADIO COMMUNICATION DEVICE: 107 | 0.41 | 320/160 | 320/x0.7 | 320/x0.8 | 320/x1.0 | 400 |

RADIO DATA COMMUNICATION APPARATUS AND METHOD OF RADIO DATA COMMUNICATION

BACKGROUND OF THE INVENTION

1. Field of the Invention

The present invention relates to a radio data communication apparatus and particularly relates to a radio data communication apparatus capable of automatically selecting a radio communication device in accordance with the communication application to be applied.

2. Background Art

Recently, services using radio communication systems using PHS (Personal Handy-Phone System) and PDC (Personal Digital Cellular) have been widely used. The radio communication systems using PHS and PDC are also utilized for exchanging electronic mails by wired communication or.a data communication executed by accessing WWW (World Wide Web) servers.

In the PHS system, transmission errors generated in the radio communication network are compensated by a radio data communication protocol such as PIAF and the like. Data collision occurring in the wire communication system can be compensated by wire communication protocols such as TCP (Transmission Control Protocol) and the like. The communication environment between a client and a server is maintained by establishment of the data communication protocol in the radio/wire communication network.

Recently, a technique has been disclosed for a mobile telephone system provided with a communication means with a radio network. Japanese Patent Application, First Publication No. Hei 9-181851 discloses a mobile telephone terminal which automatically switches the radio communication system according to the toll.

Japanese Patent Application, First Publication No. Hei 10-174169 discloses a mobile telephone terminal provided with functions as both a PHS and an automobile telephone terminal. This mobile telephone terminal is provided with devices for detecting the automobile speed and for selecting the communication line. The communication line selection device selects a communication line to be connected based on the intensity level of the receiving signal and a detected speed of the automobile.

Furthermore, Japanese Patent Application, First Publication No. Hei 10-174169 discloses a technique related to a communication line automatic selection device of a mobile radio communication terminal. This communication line automatic selection device is constituted so as to select the lowest priced communication line in accordance with the callout requirements based on the electric intensity of the transmission signal from the base station which corresponds to a plurality of transmittable applications.

However, it is desirable to provide a radio data communication apparatus which automatically selects a suitable radio communication device at the time of starting the electronic mail or the transfer of a data file.

It is also desirable to free the user of the radio data communication apparatus from a complicated switching operation for selecting a radio communication terminal suitable for a communication application.

Furthermore, in the radio data communication apparatus, it is preferable for the user to be able to freely define the important judgement parameters for selecting communication application.

Still furthermore, the radio data communication apparatus is provided with functions as a radio communication device as well as a connection interface corresponding to the communication application, based on the above-described defined parameters.

SUMMARY OF THE INVENTION

An objective of the present invention is to provide a radio data communication apparatus which automatically selects the radio communication terminal at the time of starting the communication application.

Another objective of the present invention is to provide a radio data communication apparatus, in which a user can define in advance an important aspect for each communication application.

The other objective of the present invention is to provide a radio data communication apparatus provided with functions as a radio communication terminal as well as a connection interface corresponding to the communication application based on the above defined aspect.

According to the first aspect of the present invention, the radio data communication apparatus of the present invention comprises: a first table 129 for defining in advance an important judgement parameter among a plurality of judgement parameters corresponding to a plurality of communication applications; a second table 131 for predetermining data corresponding to said few important parameters corresponding to a plurality of radio communication devices; and a control device for determining a radio communication device to be connected by first obtaining the important judgement parameters referring to said first table in response to activation of a communication application, and by then referring to said second table based on said important judgement parameters obtained from said first table.

According to the second aspect, the radio communication device to be connected according to the first aspect of the present invention is automatically selected out of said plurality of radio communication devices in response to activation of said communication application. In addition, the radio communication device is automatically selected out of a plurality of radio communication devices based on a port number corresponding to the activated communication application.

According to the third aspect, the radio data communication apparatus according to the first aspect of the present invention comprises a line control device.

According to the fourth aspect, a plurality of judgement parameters according to the first aspect of the present invention include: the time necessary for sending and receiving data; the toll for use of each communication line in said communication lines; and a power consumption at the time of use of said communication line.

According to the fifth aspect, the definition of said important judgement parameter according to the first aspect of the present invention is to select one judgement parameter out of a plurality of judgement parameters.

According to the sixth aspect, the definition of the important judgement parameters according to the first aspect of the present invention is that a priority order is to set to each of said plurality of judgement parameters. In this case, if it not possible to select a radio communication device by the most significant judgement parameter, a radio communication device is selected by the judgement parameter next to the most significant parameter.

According to the seventh aspect, the definition of said important judgement parameters according to the first aspect of the present invention is that a weighting coefficient is set to each of said plurality of judgement parameters. In this case, the radio communication device is selected by a sum of products of each of the weighing coefficients with each data corresponding to each of the plurality of judgement parameters in the second table.

According to the eighth aspect, the second table according to the first aspect includes data for each of said plurality of radio communication devices corresponding to the time required for sending and receiving data, the toll for using a plurality of communication lines, and a power consumption.

According to the ninth aspect, said data corresponding to the toll are set based on the time period at the time of sending the receiving data.

According to the tenth aspect, the data corresponding to the time period are set by classifying the receiving signal intensity level.

According to the eleventh aspect, a data corresponding to said time period is set by classifying said time necessary for sending and receiving data and a time necessary until completion of connection with said selected radio communication device.

According to the twelveth aspect, the data corresponding to said toll are set by classifying a time period, time zone, day of week, and a distance to the partner.

According to the thirteenth aspect, the method of a radio data communication comprises the steps of: acquiring an important judgement parameter referring to a first table in response to activation of a communication application, where the important judgement parameter out of a plurality of judgement parameters is pre-defined in the first table; selecting a radio communication device referring to the second table based on said acquired judgement parameter, where the data corresponding to each of the plurality of judgement parameters are pre-set in the second table; and establishing a communication line to said communication device selected for connection.

According to the fourteenth aspect, the method of a radio data communication according to the thirteenth aspect includes said plurality of judgement parameters comprising a time for sending and receiving data, a toll for use communication lines in each of said plurality of radio communication network, and a power consumption.

BRIEF DESCRIPTION OF THE DRAWINGS

FIG. 4 is a user demand table used in the radio data communication apparatus according to a third embodiment of the present invention.

FIG. 5 is a judgement parameter description table used in the radio data communication apparatus according to the first, second, and third embodiments of the present invention.

FIG. 7 is a user demand table used in the radio data communication apparatus according to the second embodiment of the present invention.

FIG. 9 is a user demand table used in the radio data communication apparatus according to the third embodiment of the present invention.

FIG. 11 shows a table describing judgement parameters in the radio data communication apparatus according to the second embodiment of the present invention.

FIG. 12 shows a table describing judgement parameters in the radio data communication apparatus according to one embodiment of the present invention.

FIG. 13 shows a judgement factor description table used in the radio data communication apparatus according to another embodiment of the present invention.

FIG. 14 shows a judgement factor description table in the radio data communication apparatus according to the other embodiment of the present invention.

DETAILED DESCRIPTION OF THE INVENTION

Hereinafter, a radio data communication apparatus and a method of radio data communication of the present invention is described with reference to the attached drawings.

Figure 1:
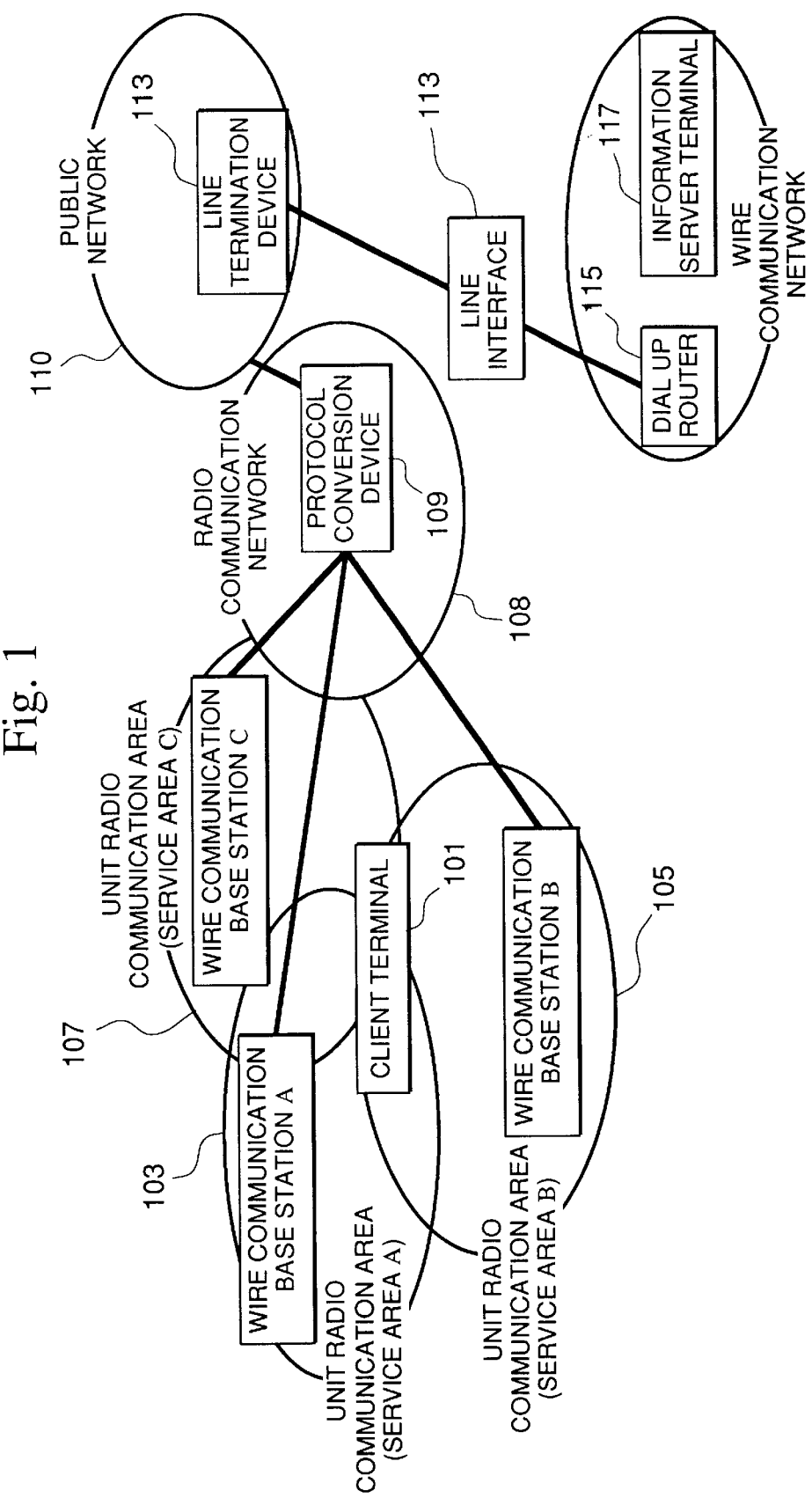
FIG. 1 is a schematic diagram showing a radio data communication system including a radio data communication apparatus of the present invention.

FIG. 1 shows a radio data communication system including a radio data communication apparatus 101 (a client's communication terminal for a client) of the present invention. The radio data communication system comprises a client's communication terminal 101, a radio communication device 103, 105 and 107, a radio communication network 108, a public network 110, and a wire communication network 114.

In the present radio data communication system, the client terminal 101 sends and receives data with the information server machine 117 through a plurality of radio communication devices (103, 105 or 107), a plurality of radio communication networks (only one radio communication network 108 is shown in FIG. 1), a public network 114, and a wire communication network 114.

The radio communication device (103, 105 or 107) is a device for the radio base station (A, B, or C) to communicate with the client machine 101 in a unit radio communication area (the service area A, B, or C).

Each of the radio communication devices (103, 105 or 107) has a different service form in terms of the data communication system, such as PHS, PDC, or other systems, the data sending and receiving time, the toll, and the power consumption.

The radio communication network 108 is a network for connecting the client machine 101 with the public network 110 through the protocol conversion device 109.

The radio base station (A, B, or C) establishes a transmission line with the client machine 101 by use of the radio communication device (103, 105, or 107) in the unit radio area (service area A, B, or C). The protocol conversion device 109 converts data used for sending and receiving between the radio communication network 108 and the public network 110, corresponding to the type of the network.

The public network 110 is a communication network such as PSTN or ISDN (Integrated Services Digital Network). The public network 110 is connected with the wire communication network 114 through the line termination device 111 (such as DSU) and a line interface 113 such as a terminal adapter or a modem.

The wire communication network 114 is a network connected with the information server machine 117 through a dial-up router 115, using a LAN (Local Area Network) and the like.

Figure 2:
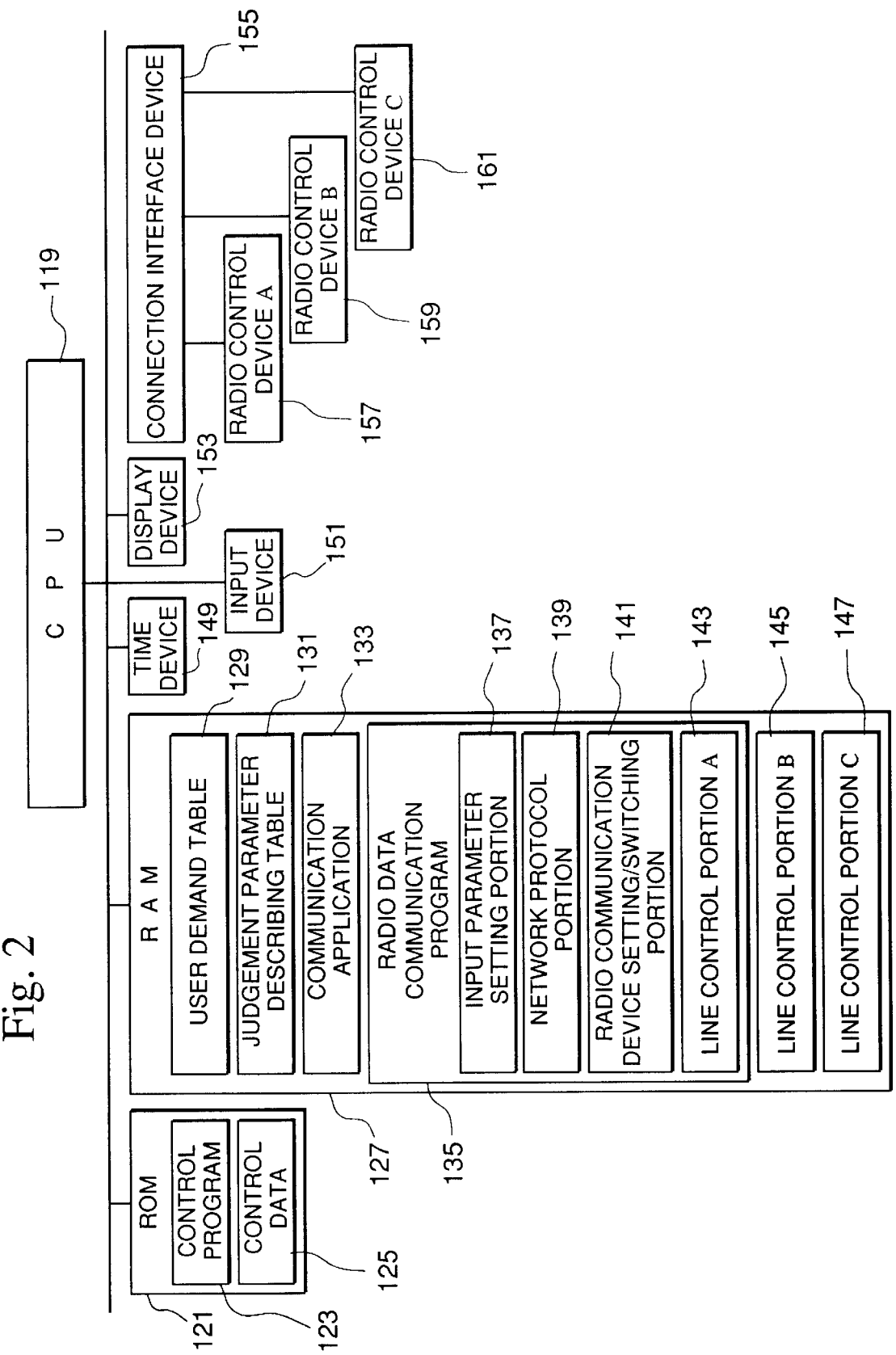
FIG. 2 is a block diagram showing a radio data communication apparatus according to a first embodiment of the present invention.

FIG. 2 shows a block diagram showing the radio data communication network comprising a client machine 101 according the first embodiment of the present invention.

The client machine 101 comprises a CPU (Central Processing Unit) 119, a ROM (Read Only Memory) 121, a RAM (Random Access Memory) 127, a time device 149, an input device 153, and a connection interface device 155. These constituting elements of the client machine 101 are mutually connected by a common data bus line and a control bus line.

CPU 119 controls all of the operations including operations by the present invention. ROM 121 stores a control program 123 such as BIOS etc., and control data 125. RAM 127 stores temporarily or permanently a user demand table 129 (the first table), a judgement factor description table 131(the second table), communication applications 133, a radio data communication program 135 and so on.

The time device 149 times dates, day of the week, or the time. The input device 151 receives inputs from users. For example, a keyboard or a pen are used as the input device 151. The indication device 153 indictaes the status of the client's device and an operating procedure. Examples of the display device 153 include a CRT (Cathod Ray Tube) or a LCD (liquid Crystal Display).

The connection interface device 155 exchanges control commands or data etc. between a radio communication control device A, B, or C and a radio data communication program 135. An example of the connection interface device 155 is a RS-232.

Each of the radio communication control apparatuses A, B, and C establishes the communication lines between each of the radio base stations A, B, and C. Each of the radio communication control apparatuses A, B, and C monitors the communication states between each of the base radio stations A, B, and C.

The radio data communication program 135 is executed simultaneously with activation of the electric source of the client machine 101. An input parameter setting portion 137 provides the information set by the client to the radio communication device setting/switching portion 141. A network protocol portion 139 establishes a communication line to the information server 117 in a wire communication network 114.

The user demand table 129 defines the judgement parameters among a plurality of judgement parameters for each of a plurality of communication applications. In the present embodiment, as shown in FIG. 4, one important judgement factor is selected from a plurality of judgement parameters as shown by a circle.

A plurality of judgement parameters includes the time for sending and receiving data (time), the toll (charge), and the power consumption. The user establishes for each communication application an appropriate radio communication device 103, 105 or 107 based on which parameters among these judgement parameters are selected.

For example, when the "File Transfer Protocol" (hereinafter, called FTP) is utilized as the communication application, the immediate processing capability for downloading and uploading is required. That is, "time" is required.

When an electronic mail (hereinafter, called E mail) is used as an application, the time is not important and it is considered that the important factor is the "toll". When the World-Wide-Web (hereinafter called WWW) is used, it is necessary to use for a long time. Thus, the important factor for this application is "power consumption". The above described parameters and the backgrounds are predetermined in the user demand table 129 by the user through the input device 151 and the input parameter setting portion 137.

The judgement parameter description table 131 predetermines the data corresponding to a plurality of judgement parameters. These data corresponding to each of a plurality of judgement parameters are set for each of a plurality of communication devices 103, 105, and 107.

The time data regarding the time necessary for communicating the data of an optional size, the data regarding the toll rate for using a communication line for an optional time, and the data regarding the electric power consumed by the use of the communication device are stored in the judgement factor description table 131.

The radio communication device setting/switching portion 141 refers to the user demand table 129 in response to an instruction from CPU 119 and obtains a judgement factor in accordance with the type of the communication application. Furthermore, the radio communication device setting/switching portion 141 refers to the judgement factor description table 131 for selecting the radio communication device based on the selected judgement parameters.

Each of the line control portions A, B, and C corresponds to each of the radio communication control devices A, B, and C. Each of the line control portions A, B, and C executes connection/disconnection for each of the radio communication control devices A, B, and C.

The line control portions A and the radio communication control device A, the line control portions B and the radio communication control device B, and the line control portions C and the radio communication control device C execute respective operations in accordance with the radio communication devices 103, 105, or 107, respectively determined by the radio communication setting/switching portion 141.

Figure 3:
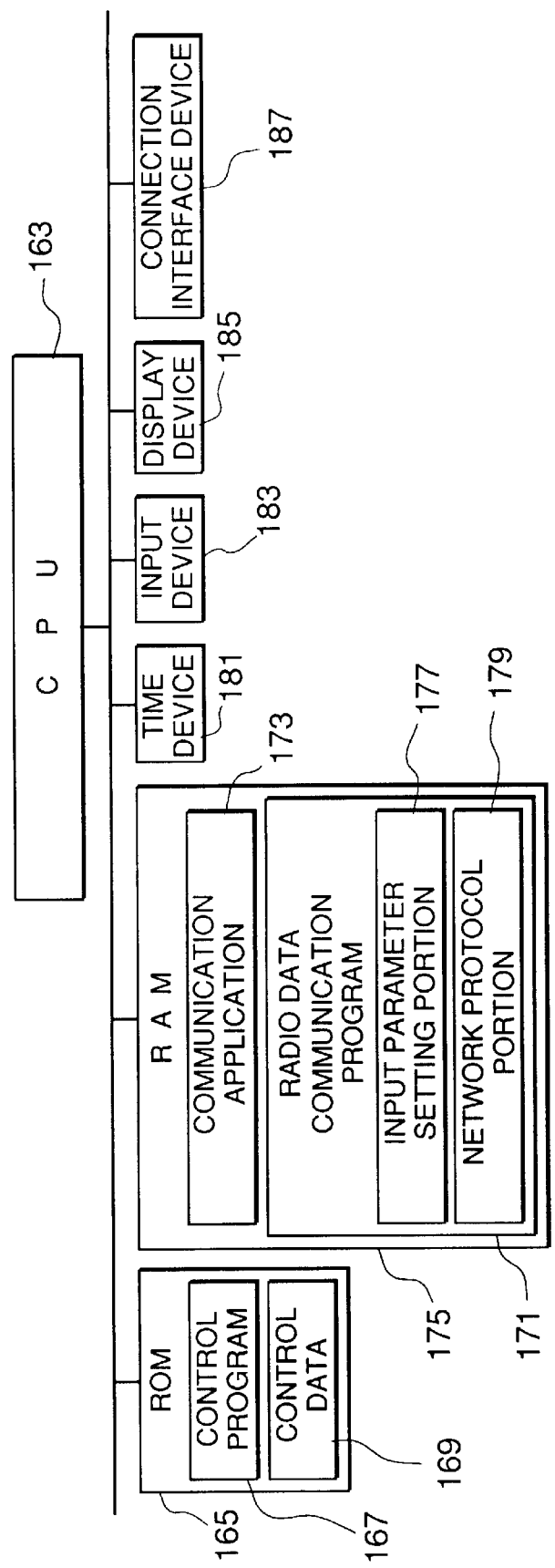
FIG. 3 is a block diagram for explaining an information server machine used for accessing the radio data communication apparatus according to a second embodiment of the present invention.

FIG. 3 is a structural block diagram showing the information server machine 117 in the radio data communication system shown in FIG. 1.

The information server machine 117 comprises a central processing unit CPU 163, a ROM 165, a RAM 171, a time device 181, a display device 185 and a communication interface device 187. The structural elements of the information server machine 117 are connected by a common data bus line and a control bus line.

The CPU 163 controls the entire operation. The entire operation interlocks with the operation of the client machine 101. The ROM 165 stores the control program 167 and the control data 169. The RAM 171 stores temporarily or permanently the communication service program 173 and the radio data communication program 175 corresponding to a communication application.

The time device 181 times the date, day of the week, and the time. The input device 183 receives an input from a manager. For example, a keyboard or a pen is used as the input device 183. The display device 185 displays the status and the operating procedure of the information server machine 117. For example, a CRT (Cathode Ray Tube) or a LCD (liquid Crystal Display) is used as the display device 185.

The communication interface device 187 exchanges control commands or data between the dial up router 115 or the radio data communication program 175. The communication interface device 187 is adopted in, for example, an easernet (the details are given in IEEE 804.2).

The radio data communication program 175 is executed simultaneously with the activation of the electric power of the information server machine. The radio data communication program 175 is provided with an input parameter setting portion 177 and a network protocol portion 179.

The input parameter setting portion 177 provides a control parameter set by a manager to the network protocol portion 179. The network protocol portion 179 establishes a communication line to the client machine 101.

The communication service program 173 is a program for providing a service complying with a communication application 133 requested by the client machine.

Figure 6:
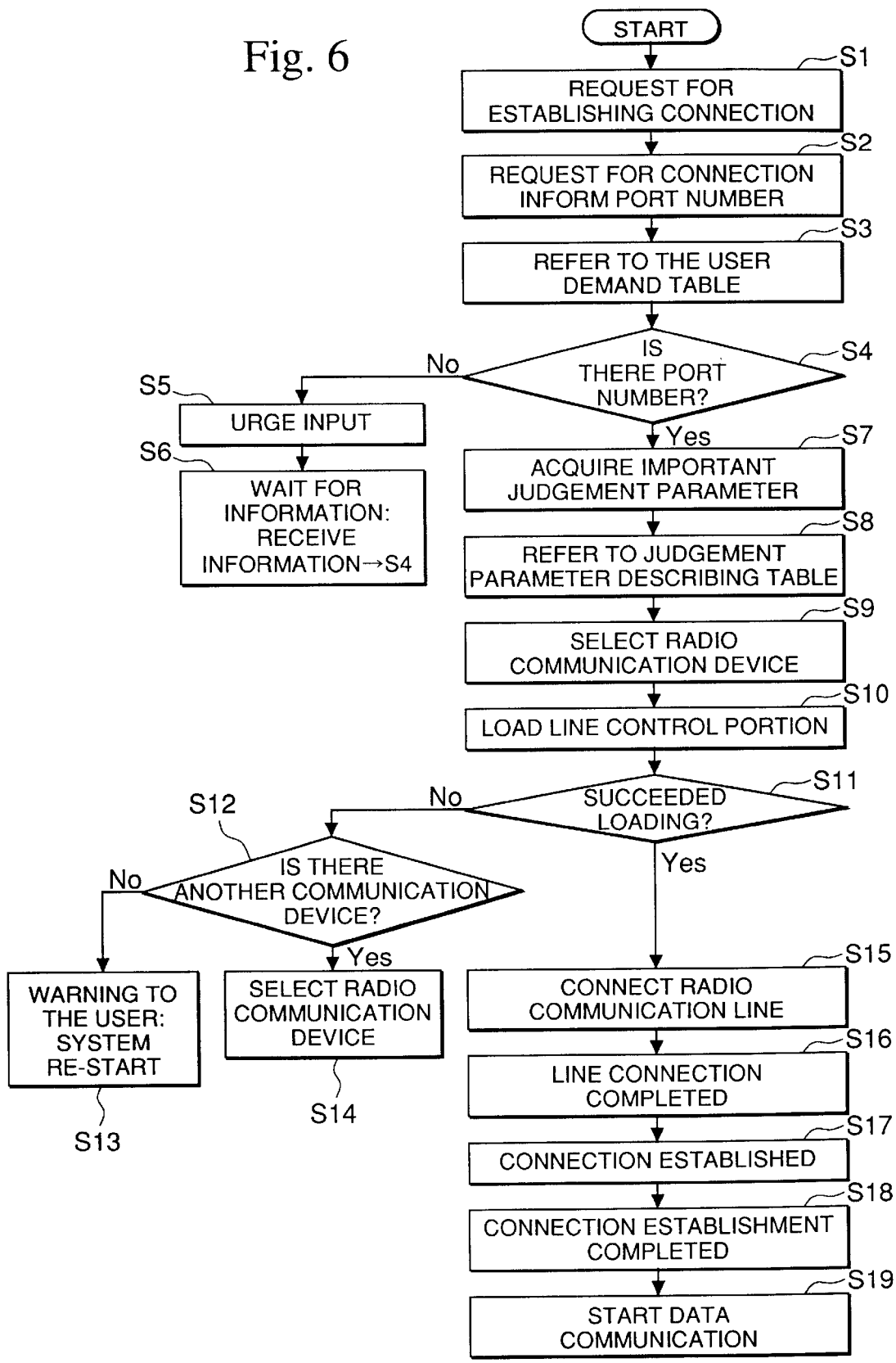
FIG. 6 is a flow-chart for explaining an operation of the radio data communication apparatus according to the first embodiment of the present invention.

FIG. 6 is a flow chart for explaining an operation of the radio data communication apparatus according to the present embodiment.

First, the communication application is activated by an user through the input device 151. The CPU 119 acquires a port number which is attached to the activated communication application. The CPU 119 request establishment of the connection to the network protocol portion 139 (step S1).

The network protocol portion 139 request connection of the communication line for the radio communication line setting/switching portion 141 and informs the port number (the type of the communication application) being acquired when requesting establishment of the connection (step S2).

The port number is used for specifying the communication service (a communication application such as "FTP") requested by the network protocol portion 139. Referring to FIG. 4, a port number 80 is allocated to the "WWW" as a communication application. The practical allocation of the port numbers is recited by the RFC 1340.

When the radio communication device setting/switching portion 141 recognizes that there is an acquired port number in the user's demand table 129, the routine goes to the step S7.

In the step S5, the radio data communication program 175 outputs an instruction to urge the input parameter setting portion 137 output of a setting input. The input parameter setting portion 137 urges a user to set a judgement factor among a plurality of judgement parameters (the time for sending and receiving data, the toll, and the power consumption) in response to the instruction of the radio communication device setting/switching portion 141.

The input parameter setting portion 137 waits for a notification from the input device 151 (step S6) in terms of the above setting, and transfers the notice from the input device 151 to the radio communication device setting/switching portion 141. The radio communication device setting/switching portion 141 shifts the routine to the step S4, in response to the notification from the input parameter setting portion 137.

In the step S7, the radio communication device setting/switching portion 141 acquires the important judgement factor for the user, with reference to the user demand table 129. Furthermore, the radio communication device setting/switching portion 141 selects a radio communication device (step S9), to which the lowest value among the acquired judgement parameters is set, with reference to the judgement factor description table 131 stored in the RAM 127 (step S8).

Next, the radio communication device setting/switching portion 141 loads the line control portion (A, B, or C) for the selected radio communication device (step S10). The radio communication device setting/switching portion 141 determines whether or not the loading is successfully done (step S11).

When the radio communication device setting/switching portion 141 determines that the loading has been successful, the routine goes to the step S15. When the radio communication device setting/switching portion 141 determines that the loading has not been successful, the routine goes to the step S12.

In step S12, the radio communication device setting/switching portion 141 judges whether or not there is another radio communication device. If the radio communication device setting/switching portion 141 determines that there is another radio communication device, the routine goes to the step S14.

If the radio communication device setting/switching portion 141 determines that there is no other radio communication device, the routine goes to the step S13. In the step S13, the radio communication device setting/switching portion 141 warns the user that the line control portion can not be loaded through the CPU 119 and the display device 153, and urges the user to reactivate the system.

In the step S14, the radio communication device having the next smallest value among the important judgement parameters for the user is selected and the routine goes to the step S10. The line control portion loaded at the step S15 connects the radio communication line through the corresponding radio control portion.

The loaded line control portion informs the network protocol portion 139 through the radio communication device setting/switching portion 141 that the line is connected (step S16). The network protocol portion 139 establishes the connection between the network protocol 179 (hereinafter, included in the information server machine) of the information server machine 117 (step S17).

The CPU 119 (the radio communication device setting/switching portion 141) informs the communication application 133 that the connection has been established (S19).

The radio data communication apparatus 101 according to the present embodiment of the present invention automatically selects the radio communication device to be connected at the time that the communication application 133 is activated, and executes the data communication between the information server machine 117. The automatic selection processing is executed based on data predetermined in two tables comprised of the user demand table 129 and the judgement factor description table 131.

The automatic selection processing of the radio communication device in the radio data communication apparatus 101 of the present invention can be executed at a timing other than that shown above.

The first of the other possible timings is when the data is lacked during sending and receiving data. The second timing is the time after sending a unit amount of data predetermined at the time of connection to the information server machine 117. The third timing is when the radio communication line is cut during sending and receiving data.

In the above first, second and third timings, the CPU 119 automatically re-selects a radio communication device based on the user demand table 129 and the judgement factor description table 131 in response to a signal as a trigger from the radio communication control device for changing the communication line. The radio communication control device for generating the signal as the trigger is connected to the information server 117 through the connection interface device 155.

Figure 8:
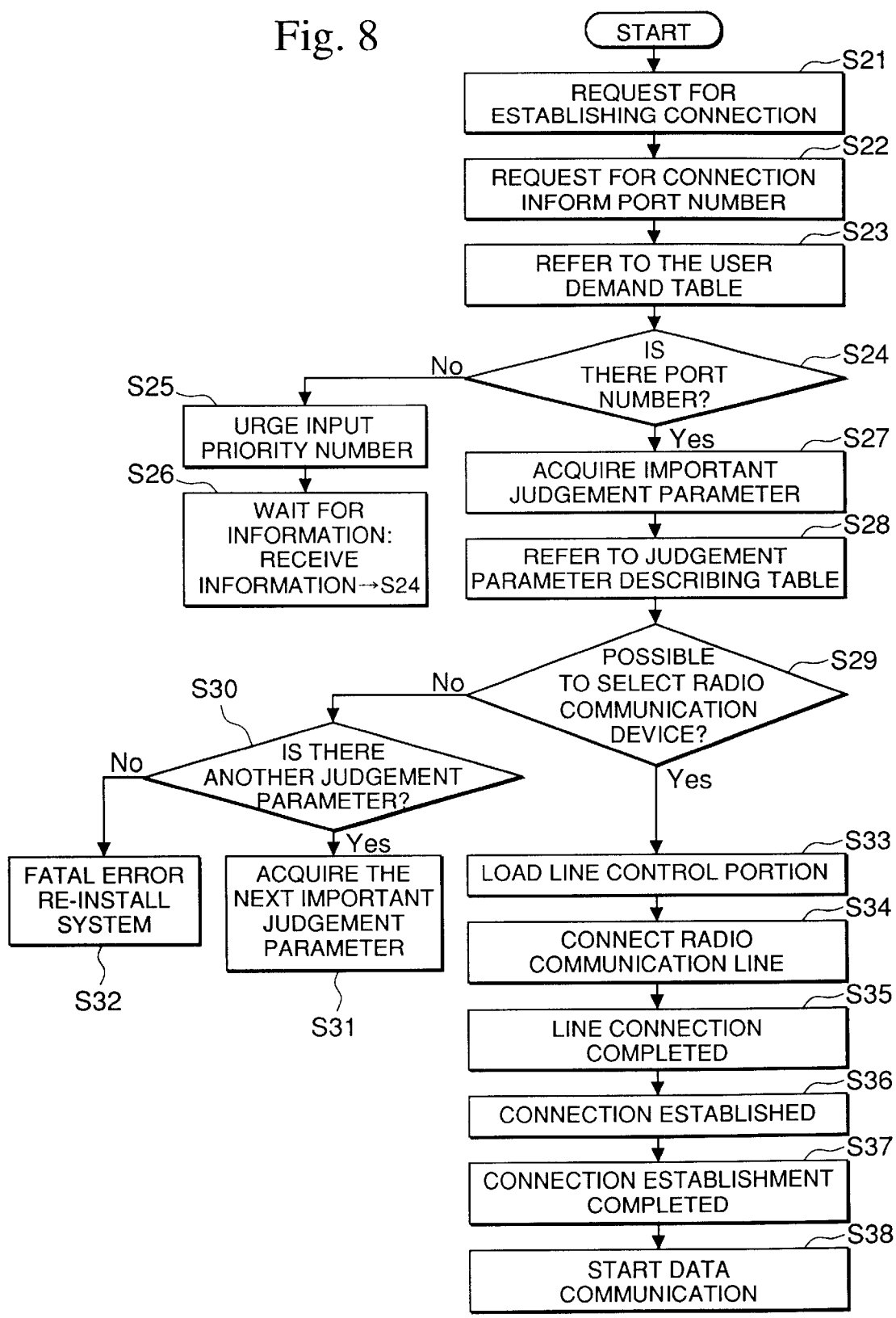
FIG. 8 is a flow-chart for explaining the operation of the radio data communication apparatus according to the second embodiment of the present invention.

Furthermore, in the first, second and third timings, the CPU 119 executes processing from the step S8 shown in FIG. 8 and re-selects automatically the radio communication device for changing the communication line.

Hereinafter, a radio data communication apparatus according to the second embodiment of the present invention is described. The structure of the radio data communication apparatus (the client machine 101) according to the second embodiment is basically the same as that of the first embodiment.

The user demand table (the first table) 129 according to this embodiment predetermines the important judgement parameters among a plurality of judgement parameters. As shown in FIG. 7, in this embodiment, in order to define the importance of the judgement parameters, a priority number is given to each of a plurality of judgement parameters.

In the present embodiment, when the radio communication device can not be selected by use of the judgement factor placed at the first priority, the radio communication device is selected by the judgement factor at the second priority.

A user of the client machine 101 predetermines the priority order among a plurality of judgement parameters such as the time for sending and receiving data (time), the toll, aid the power consumption for each communication application, in order to select a radio communication device by use of the first judgement factor. This priority order is designated through the input parameter portion.

When, for example, the FTP application is used, the "time" which is designated as "1" is placed at the most significant factor. If a radio communication device cannot be selected based on the "time", the radio communication device is automatically selected by the "toll" designated as "2". The judgement factor description table (the second table) 131 is the same as that in the first embodiment.

FIG. 8 is a flow chart showing the operation of the radio data communication apparatus according to the second embodiment of the present invention. The operation of the present client machine 101 is described with reference to FIGS. 2 and 8.

The communication application is activated by a user through the input device 151. The CPU 119 acquires the port number attached to the activated communication application. The CPU 119 requests that the network protocol portion 139 establish a connection (step S1).

The network protocol portion 139 requests that the radio communication device setting/switching portion 141 connects a communication line, and notifies the radio communication device setting/switching portion 141 the port number acquired at the establishment of the connection (step S22).

When receiving the demand to connect the communication line, the radio communication device setting/switching portion 141 refers to the user demand table 129 in the RAM 127 (step S23) and determines whether or not there is an acquired port number (step S24).

When the radio communication device setting/switching portion 141 confirms that there is an acquired port number, the routine goes to the step S27. When the radio communication device setting/switching portion 141 recognizes that there is no port number, the routine goes to the step S25.

In the step S25, the radio communication device setting/switching portion 141 outputs an instruction to urge the establishment of the priority order for inputting into the input parameter setting portion 137. In response to the instruction from the radio communication device setting/switching portion 141, the input parameter setting portion 137 urges the user to establish a priority order for a plurality of judgement parameters (time for sending and receiving data, toll, power consumption).

When the notification regarding the above setting from the input device is received (step S26), the input parameter setting portion 137 transfers the notification from the input device to the radio communication device setting/switching portion 141. The radio communication device setting/switching portion 141 shifts the processing to the step S24 in response to the notification from the input parameter setting portion 137.

In the step S27, the radio communication device setting/switching portion 141 acquires the judgement factor placed as the first place by the user with reference to the user demand table 129.

Next, the radio communication device setting/switching portion 141 refers to the judgement parameter description table 131 (step S28) for confirming whether or not the radio communication device designated at the lowest value in terms of the acquired judgement parameter is one (step S29).

In the step S29, when the radio communication device setting/switching portion 141 confirms that the radio communication device designated at the lowest value in terms of the acquired judgement parameter is one, the routine is shifted to the step S30.

In the step S30, the radio communication device setting/switching portion 141 judges whether there is a second judgement parameter next to the most significant parameter with reference to the user demand table 129.

When the radio communication device setting/switching portion 141 confirms that there is a second judgement parameter next to the most significant parameter, the routine is shifted to the step S31. In the step S31, the radio communication device setting/switching portion 141 acquires the third judgement parameter next to the second parameter and shifts to the processing at the step S29.

When the radio communication device setting/switching portion 141 judges that there is no second judgement parameter next to the most significant one, the routine goes to the step S32. In the step S32, the radio communication device setting/switching portion 141 urges the re-installation of the system, warning that the judgement parameter description table is destroyed.

In the step S33, the radio communication device setting/switching portion 141 loads the line control portion (A, B, or C) corresponding to the selected radio communication device. The up-loaded line control portion connects the radio communication line through the corresponding radio communication line control portion (step S34).

The loaded line control portion informs the network protocol portion 139 that the line is connected through the radio communication device setting/switching portion 141 (step S35). The network protocol portion 139 establishes a connection between the information server machine 117 and the network protocol portion 179 (hereinafter called information server machines79) (step S36).

The CPU 119 (the radio communication device setting/switching portion 141) informs to the communication application 133 that the connection is established (step S37). The communication application 133 starts communication between the information server machine 117 through the network protocol 139 (step S38).

Next, the third embodiment of the present invention will be described. The structure of the radio data communication apparatus (the client machine 101) of the third embodiment is the same as that of the first embodiment.

The user demand table (the first table) 129 according to the third embodiment predetermines the important judgement parameter among a plurality of judgement parameters in accordance with each of a plurality of communication applications. As shown in FIG. 9, in the third embodiment, a weighting coefficient is designated to each of a plurality of judgement parameters for determining the important judgement parameters.

In the present embodiment, a calculation is executed to obtain a sum of the products of each of the designated weighting coefficients and each data corresponding to each of the plurality of judgement parameters. The radio communication line is selected based on the result of the sum of the product calculation.

The user establishes the weighting coefficients for each of a plurality of judgement parameters (time for sending and receiving data, toll, and power consumption) for selecting the important parameters.

As shown in FIG. 9, when "FTP" is used as a communication application, the coefficients such as the time for sending and receiving data, the toll, and the power consumption are set "4.82, "4.2", and "1.0", respectively. The weighting coefficient for each parameter is set by the user through the input parameter setting portion 137.

Figure 10:
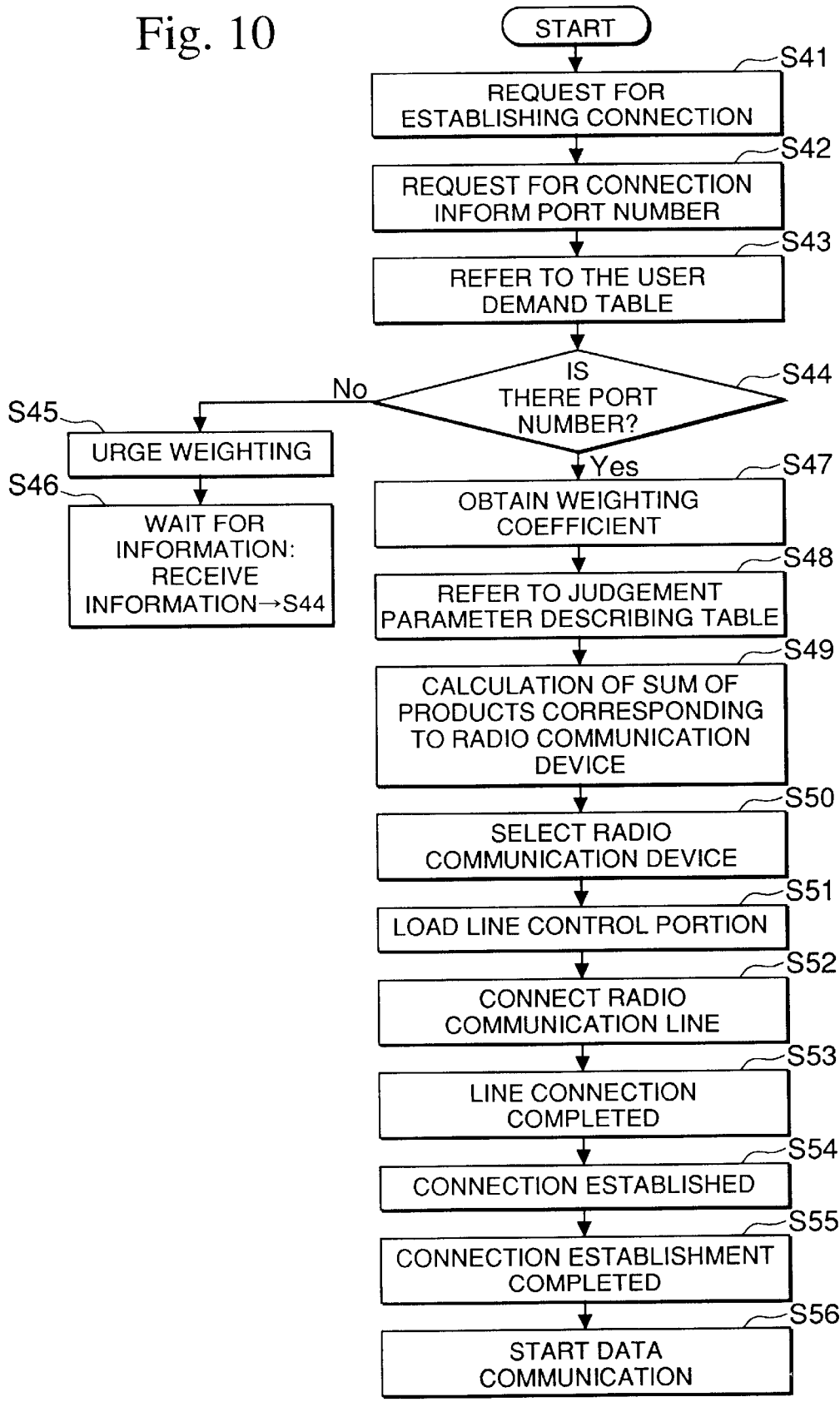
FIG. 10 is a flow-chart for explaining the operation of the radio data communication apparatus according to the third embodiment of the present invention.

FIG. 10 is a flow chart for explaining the operation of a radio data communication apparatus according to the present embodiment. The operation of the client machine 101 is described.

First, the communication application is activated by a user through the input device 151. The CPU 119 acquires a port number attached to the activated communication application. The CPU 119 requests an establishment of the connection to the network protocol portion 139 (step S41).

The network protocol portion 139 requests from the radio communication device setting/switching portion 141 the connection of the communication line, and provides the port number acquired at the time of requesting the connection establishment (step S42).

The radio communication device setting/switching portion 141 refers to the user demand table 129 stored in the RAM 127, in response to the request for establishment of the connection for verifying whether or not there is an acquired number (step S44).

When the radio communication device setting/switching portion 141 verifies that the number has been acquired, the processing goes to the step S47. In contrast, when the radio communication device setting/switching portion 141 verifies that there is no acquired number, the processing goes to the step S45.

In the step S45, the radio communication device setting/switching portion 141 outputs an instruction to urge the setting input to the input parameter setting portion 137. The input parameter setting portion 137 urges to the user to set the weighting coefficient for each of a plurality of judgement parameters (time for sending and receiving data, toll, and power consumption), in response to the instruction from the radio communication device setting/switching portion 141.

When the input parameter setting portion 137 receives the notification from the input device 151 concerning the above setting (step S46), the notification from the input device 151 is sent to the radio communication device setting/switching portion 141. The radio communication device setting/switching portion 141 responds to the notification from the input parameter setting portion 137 and shifts the processing to the step S47.

In the step S47, the radio communication device setting/switching portion 141 refers to the user demand table 129 and acquires the weighting coefficients for important judgement parameters among a plurality of judgement parameters. The radio communication device setting/switching portion 141 refers to the judgement parameters description table 131 (step S48).

The radio communication device setting/switching portion 141 executes calculation for obtaining the sum of the product corresponding to the radio communication device (step S49). The calculation is carried out by the CPU 119.

Referring to FIGS. 5 and 9, when, for example, the "FTP" is used for the communication application, the weighting coefficients for the respective judgement parameters ("4.8" for the time, "4.2" for the toll, and "12 for the power consumption) are obtained.

The sum of the products for the radio communication device 103 is calculated as "706. 584" (=4.8×33+4.2×25+1×400). The sums of the products for the radio communication devices 105 and 108 are obtained as "553. 376 (4.8×0.62+4.2×12+1×500) and "477.568" (=4.8×0.41+4.2× 18+1×400), respectively.

Based on the result of the calculation in the step S49, the radio communication device which gives the smallest value is selected (step S50). In the above examples, the radio communication device 107 is selected.

Next, the radio communication device setting/switching portion 141 loads the line control portion (A, B, or C) corresponding to the selected radio communication device (step 51). The loaded line control portion connects the radio communication line through the corresponding radio control portion (step S52).

The loaded line control portion inform the network protocol portion that the line is connected through the radio communication device setting/switching portion 141 step S53). The network protocol portion 139 establishes a connection to the network protocol portion 179 of the information server portion 117 (hereinafter, included in the information server portion 117) (step S54).

The CPU 119 (the radio communication device setting/switching portion 141) informs the establishment of the connection to the communication application 133 (step S55). The communication application 133 starts data communication between the information server machine 117 through the network protocol portion 139 (step S56).

In the above first, second, and third embodiments, the table shown in FIG. 5 is used for the judgement parameter description table (the second table) 131. Another examples of the judgement parameter description table 131 are shown in FIGS. 11, 12, 13, and 14.

As shown in FIG. 11, the time for sending and receiving data ("time")is set in a more detail by classifying by the level of the receiving signal intensity. As shown in FIG. 12, the time for sending and receiving data shown in FIG. 5 is set in more classified form based on the time for exchanging data and the time needed until completion of the connection.

As shown in FIG. 13, the "toll", which is one of the judgement parameters shown in FIG. 5, is set in a more classified form based on the period of used time, the time zone, day of the week, and the distance from the partner. As shown in FIG. 14, the values of parameters such as the time and the toll necessary for sending and receiving a unit of data with an optional size are shown for each radio communication device.

Regarding the second table, the judgement parameter description tables of FIGS. 11, 12, 13, and 14 are used by properly combining them with any one of FIGS. 4, 7, and 9.

The radio data communication apparatus of the present invention automatically selects a radio communication device suitable for using a communication application. A user of the radio data communication apparatus is released from the sophisticated switching operations of the radio communication devices. This is because the user can freely decide the important aspects for each application.

What is claimed is:

1. A radio data communication apparatus comprising:
   a first table for defining in advance an important judgement parameter among a plurality of judgement parameters corresponding to a plurality of communication applications;
   a second table for previously determining data corresponding to said few important parameters corresponding to a plurality of radio communication devices; and
   a control device for determining a radio communication device to be connected by first obtaining the important judgement parameters referring to said first table in response to activation of a communication application, and by then referring to said second table based on said important judgement parameters obtained from said first table;
   wherein said plurality of judgement parameters include:
      a time period necessary for sending and receiving data;
      a toll for use of each communication line in said communication lines; and
      a power consumption at the time of use of said communication line.

2. A radio data communication apparatus comprising:
   a first table for defining in advance an important judgement parameter among a plurality of judgement parameters corresponding to a plurality of communication applications;
   a second table for previously determining data corresponding to said few important parameters corresponding to a plurality of radio communication devices; and
   a control device for determining a radio communication device to be connected by first obtaining the important judgement parameters referring to said first table in response to activation of a communication application, and by then referring to said second table based on said important judgement parameters obtained from said first table;
   wherein said second table includes data for each of said plurality of radio communication devices corresponding to a time period required for sending and receiving data, a toll for use of the communication line, and a power consumption.

3. A radio data communication apparatus comprising:
   a first table for defining in advance an important judgement parameter among a plurality of judgement parameters corresponding to a plurality of communication applications;
   a second table for previously determining data corresponding to said few important parameters corresponding to a plurality of radio communication devices; and
   a control device for determining a radio communication device to be connected by first obtaining the important judgement parameters referring to said first table in response to activation of a communication application, and by then referring to said second table based on said important judgement parameters obtained from said first table;
   wherein said data corresponding to said time period are set by classifying the intensity levels of the receiving signal.

4. A radio data communication apparatus according to claim 2, wherein said data corresponding to said time period are set by classifying said time period necessary for sending and receiving data and a time period necessary until completion of connection with said selected radio communication device.

5. A radio data communication apparatus according to claim 2, wherein said data corresponding to said toll are set by classifying a time period, time zone, day of week, and a distance to the partner.

6. A radio data communication apparatus according to claim 2, wherein said data corresponding to said toll are set based on the time period, time zone, day of week, and a distance to the partner.

7. A method of a radio data communication comprising the steps of:
   acquiring an important judgement parameter referring to a first table in response to activation of a communication application, wherein the important judgement parameter out of a plurality of judgement parameters is pre-defined in the first table;
   selecting a radio communication device referring to the second table based on said acquired judgment parameter, wherein the data corresponding to each of the plurality of judgment parameters are pre-set in the second table; and
   establishing a communication line to said communication device selected for connection;
   wherein said plurality of judgement parameters includes a time for sending and receiving data, a toll for use of communication lines in each of said plurality of radio communication networks, and power consumption.

8. A data communication apparatus for communicating through one of a plurality of communication devices using one of a plurality of application types, the apparatus comprising:
   a first memory which includes a list of application types for the apparatus, a list of variables used in determining a communication device to use for each application type in communicating with the apparatus, and an indication as to how to analyze the variables when determining the communication device to use;
   a second memory which includes a list of the communication devices available for the apparatus, and data indicating respective values for respective variables corresponding to respective communication devices; and
   a controller which receives a request for communication using a particular one of the application types and which determines a particular communication device based on the indication in the first memory and the data in the second memory.

9. The data communication apparatus as recited in claim 8, wherein the indication includes a weight assigned for each variable.

10. The data communication apparatus as recited in claim 8, further comprising a line control device which establishes a communication line between the data communication apparatus and the particular communication device.

11. The data communication apparatus as recited in claim 8, wherein the variables include at least one of: a time period for sending data from and receiving data to the data communication apparatus, a toll incurred using the respective communication device, and power consumed in using the respective communication device.

12. The data communication apparatus as recited in claim 8, wherein the indication selects only one of the variables to be used in determining the particular communication device.

13. The data communication apparatus as recited in claim 8, wherein the indication includes a priority order for the variables so that when the particular communication device cannot be determined using a first one of the variables, a second one of the variables in the priority order is used to determine the particular communication device.

14. The data communication apparatus as recited in claim 8, wherein the second memory includes data relating to at least one of: a time period for sending data to and receiving data from the respective communication device, a toll incurred in using the respective commination device, and power consumed using the respective communication device.

15. The data communication apparatus as recited in claim 14, wherein the data relating to the toll is based on a time period, time zone, day of the week, and distance between the respective communication device and the data communication apparatus.

16. A method for communicating in a data communication apparatus through one of a plurality of communication devices using one of a plurality of application types, the method comprising:

storing a list of the application types for the apparatus, a list of variables used in determining a communication device to use for each application type in communicating with the apparatus, and an indication as to how to analyze the variables when determining the communication device to use;

storing a list of the communication devices for the apparatus, and data indicating respective values for respective variables corresponding to the respective communication devices;

receiving a request for communication from the apparatus using a particular one of the application types; and determining a particular communication device based on the request, based on the indication and based on the data indicating respective values for respective variables.

17. The method as recited in claim 16, wherein the indication includes a weight assigned for each variable.

18. The method as recited in claim 16, further comprising establishing a communication line between the data communication apparatus and the particular communication device.

19. The method as recited in claim 16, wherein the variables include at least one of: a time period for sending data from and receiving data to the data communication apparatus, a toll incurred in using the respective communication device, and power consumed in using the respective communication device.

20. The method as recited in claim 16, wherein the indication selects only one of the variables to be used in determining the particular device.

21. The method as recited in claim 16, wherein the indication includes a priority order for the variables so that when the particular communication device cannot be determined using a first one of the variables, a second one of the variables in the priority order is used to determine the particular communication device.

22. The method as recited in claim 16, wherein the data indicating respective values for respective variables includes data relating to at least one of: a time period for sending data to and receiving data from the respective communication device, a toll relating to the respective commination device, and power consumption related to the respective communication device.

23. The method as recited in claim 16, wherein the data relating to the toll is based on a time period, time zone, day of the week, and distance between the respective communication device and the data communication apparatus.

* * * * *